US012715493B2

(12) United States Patent
Zhong

(10) Patent No.: US 12,715,493 B2
(45) Date of Patent: Aug. 25, 2026

(54) INFANT CARRIER AND HEIGHT ADJUSTMENT MECHANISM

(71) Applicant: WONDERLAND SWITZERLAND AG, Steinhausen (CH)

(72) Inventor: Zhiren Zhong, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 402 days.

(21) Appl. No.: 18/259,673

(22) PCT Filed: Jan. 5, 2022

(86) PCT No.: PCT/EP2022/050156
§ 371 (c)(1),
(2) Date: Jun. 28, 2023

(87) PCT Pub. No.: WO2022/148782
PCT Pub. Date: Jul. 14, 2022

(65) Prior Publication Data

US 2024/0067252 A1 Feb. 29, 2024

(30) Foreign Application Priority Data

Jan. 5, 2021 (CN) ........................ 202110015379.3

(51) Int. Cl.
*B62B 7/14* (2006.01)
*B62B 9/12* (2006.01)

(52) U.S. Cl.
CPC ................ *B62B 7/142* (2013.01); *B62B 9/12* (2013.01); *B62B 2206/06* (2013.01)

(58) Field of Classification Search
CPC .. B62B 7/142; B62B 7/14; B62B 9/12; B62B 9/10; B62B 9/102; B62B 9/104; B62B 2206/06
See application file for complete search history.

(56) References Cited

U.S. PATENT DOCUMENTS 5,468,051 A 11/1995 Huang
5,520,433 A 5/1996 Tokutake et al.
(Continued)

FOREIGN PATENT DOCUMENTS

CN 2792900 Y 7/2006
CN 201214439 Y 4/2009
(Continued)

OTHER PUBLICATIONS

"Notice of Allowance Issued in Corresponding Chinese Patent Application No. 202110015379.3", Mailed Date: Mar. 3, 2025, 14 pages.

(Continued)

*Primary Examiner* — John D Walters
(74) *Attorney, Agent, or Firm* — Volpe Koenig

(57) ABSTRACT

The height adjustment mechanism comprises a positioning member, an elastic member, a release operation member, and a fixing seat for assembling and connecting with the carrier body. The fixing seat is slidably arranged on a carrier frame and is slidably adjustable with respect to the carrier frame. The carrier frame comprises at least two positioning portions. The positioning member is movably assembled on the fixing seat and enables to selectively engage with any of the positioning portions. The release operation member is movably installed on the fixing seat and is linked with the positioning member through the elastic member.

20 Claims, 13 Drawing Sheets

(56) References Cited

U.S. PATENT DOCUMENTS

| | | | | |
|---|---|---|---|---|
| 6,224,077 | B1 | 5/2001 | Sheng | |
| 6,715,783 | B1 | 4/2004 | Hanson et al. | |
| 7,789,402 | B2 * | 9/2010 | Saville | B62B 7/145 280/47.38 |
| 9,565,950 | B2 * | 2/2017 | Horst | A47D 9/016 |
| 9,895,005 | B2 * | 2/2018 | Castilla | A47D 5/00 |
| 10,449,987 | B2 * | 10/2019 | Gibson | B62B 9/28 |
| 2008/0296872 | A1 | 12/2008 | Saville et al. | |
| 2013/0087993 | A1 * | 4/2013 | Jacquet | B62B 7/12 280/647 |
| 2015/0173523 | A1 | 6/2015 | Horst et al. | |
| 2015/0335170 | A1 | 11/2015 | Castilla | |

FOREIGN PATENT DOCUMENTS

| | | | |
|---|---|---|---|
| CN | 101785618 | A | 7/2010 |
| CN | 102275608 | A | 12/2011 |
| CN | 202574328 | U | 12/2012 |
| CN | 203528545 | U | 4/2014 |
| CN | 203709663 | U | 7/2014 |
| CN | 203996380 | U | 12/2014 |
| CN | 205168610 | U | 4/2016 |
| CN | 105644604 | A | 6/2016 |
| CN | 105752144 | A | 7/2016 |
| CN | 107031691 | A | 8/2017 |
| CN | 109649467 | A | 4/2019 |
| CN | 209290468 | U | 8/2019 |
| CN | 110435747 | A | 11/2019 |
| CN | 210416707 | U | 4/2020 |
| DE | 202006012430 | U1 | 10/2006 |
| JP | 2003019959 | A | 1/2003 |
| JP | 2003052495 | A | 2/2003 |
| JP | 2020-19364 | A | 2/2020 |
| TW | 201711603 | A | 4/2017 |
| WO | 2021144406 | A1 | 7/2021 |

OTHER PUBLICATIONS

"Second Office Action Issued in Corresponding Japanese Patent Application No. 2023-540723", Mailed Date: Mar. 11, 2025, 8 pages.

Office Action issued in corresponding Chinese Application No. 202110015379.3 dated Jul. 5, 2024.

Notice of Reasons for Refusal issued in corresponding Japanese Application No. 2023-540723 dated Aug. 6, 2024.

International Search Report and Written Opinion for Application No. PCT/EP2022/050156 dated Apr. 4, 2022.

Office Action issued in corresponding Taiwanese Application No. 112125223 dated Nov. 10, 2023.

First Office Action for corresponding Taiwan Application No. 114119274 dated Aug. 14, 2025, 6 pages.

IP Australia. Notice of Allowance for corresponding application AU 2025201470, mailed Jun. 12, 2026. 3 pages.

* cited by examiner

31

INFANT CARRIER AND HEIGHT ADJUSTMENT MECHANISM

CROSS-REFERENCE TO RELATED APPLICATIONS

This application is a National Stage application of PCT/EP2022/050156, filed on Jan. 5, 2022, which claims the benefit of Chinese Application No. 202110015379.3, filed on Jan. 5, 2021, both of which are incorporated herein by reference in their entirety.

TECHNICAL FIELD

The enclosure relates to an infant carrier and a height adjustment mechanism.

BACKGROUND

Baby carriages have been widely used in children's families for a long time, and this kind of baby carriage usually has a frame and a sleeping box or seat selectively arranged on the frame. In order to facilitate the use of baby carriages, some baby carriages are provided with a seat height adjustment mechanism between the frame and the seat. The present seat height adjustment mechanism comprises an operating mechanism and an engaging mechanism. The locking release (unlock) of the engaging mechanism can be controlled by operating the operating mechanism, so that the height of the seat relative to the frame can be adjusted.

SUMMARY

A height adjustment mechanism according to the disclosure is provided, wherein the infant carrier is arranged on an infant carrier and comprises a carrier frame and a carrier body; the height adjustment mechanism comprises a positioning member, an elastic member, a release operation member, and a fixing seat for assembling and connecting with the carrier body; the fixing seat is slidably arranged on the carrier frame and is slidably adjustable with respect to the carrier frame; the carrier frame comprises at least two positioning portions; the positioning member is movably assembled on the fixing seat and enables to selectively engage with any of the positioning portions; the release operation member is movably installed on the fixing seat; the release operation member is linked with the positioning member through the elastic member; and during an engaging release process, a force of the release operation member for making the elastic member to generate an elastic deformation is smaller than a resisting force generated by both the fixing seat and the carrier body on the fixing seat for blocking an engaging release movement of the positioning member.

An infant carrier according to the disclosure comprises a carrier frame, a carrier body, and a height adjustment mechanism as mentioned above, and the fixing seat is assembled on the carrier body.

DETAILED DESCRIPTION

In order to describe the technical content and structural features of the disclosure in detail, the further description will be given in conjunction with the embodiments and the accompanying drawings hereafter.

Figure 1:
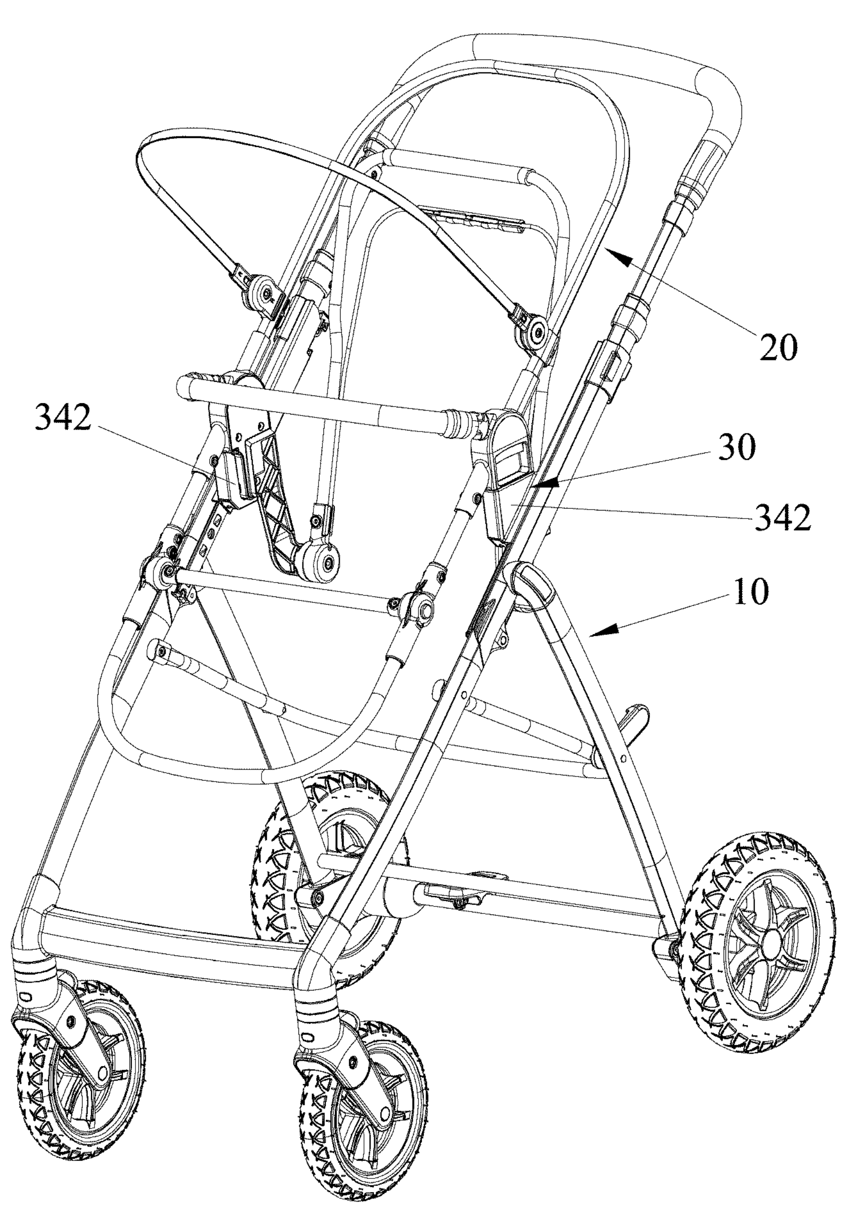
FIG. 1 is a schematic diagram of a three-dimensional structure of an infant carrier according to the disclosure.
Figure 2:
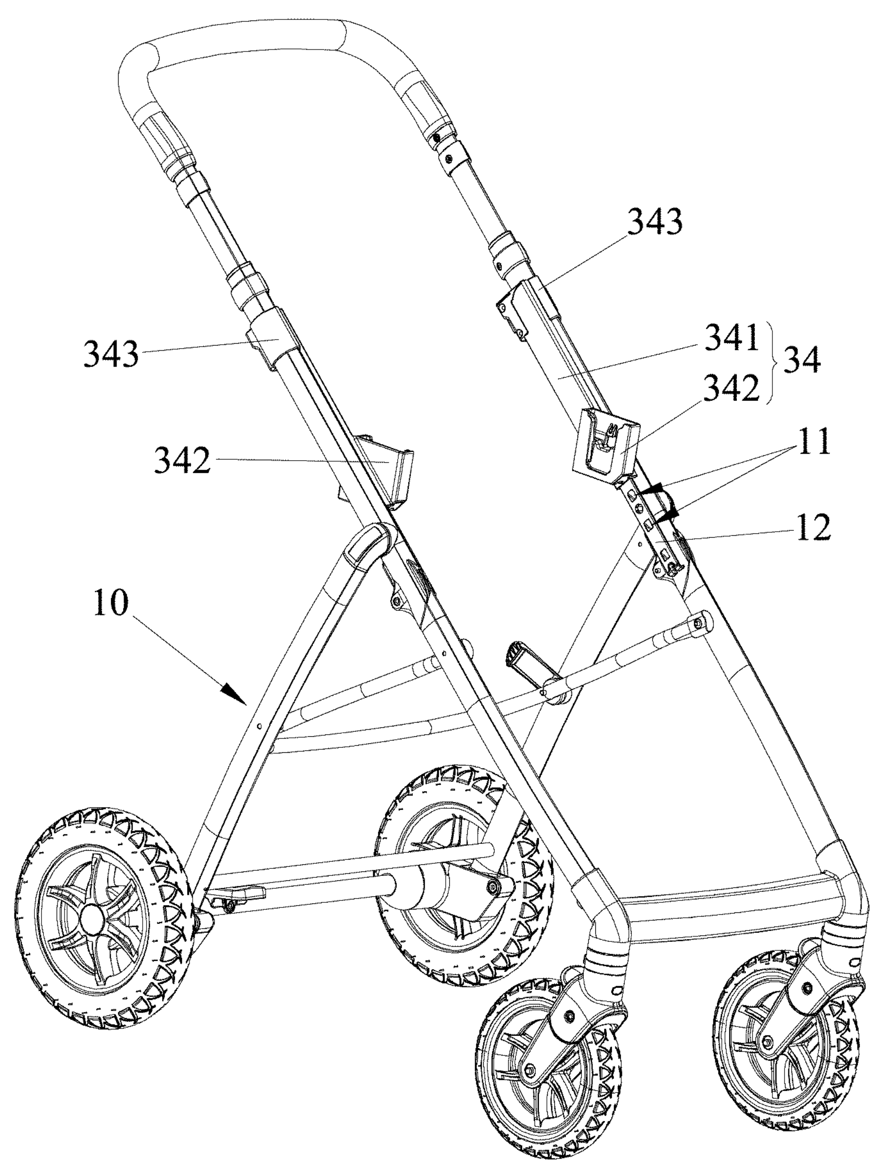
FIG. 2 is a schematic diagram of a three-dimensional structure of a carrier frame in the infant carrier according to the disclosure.
Figure 3:
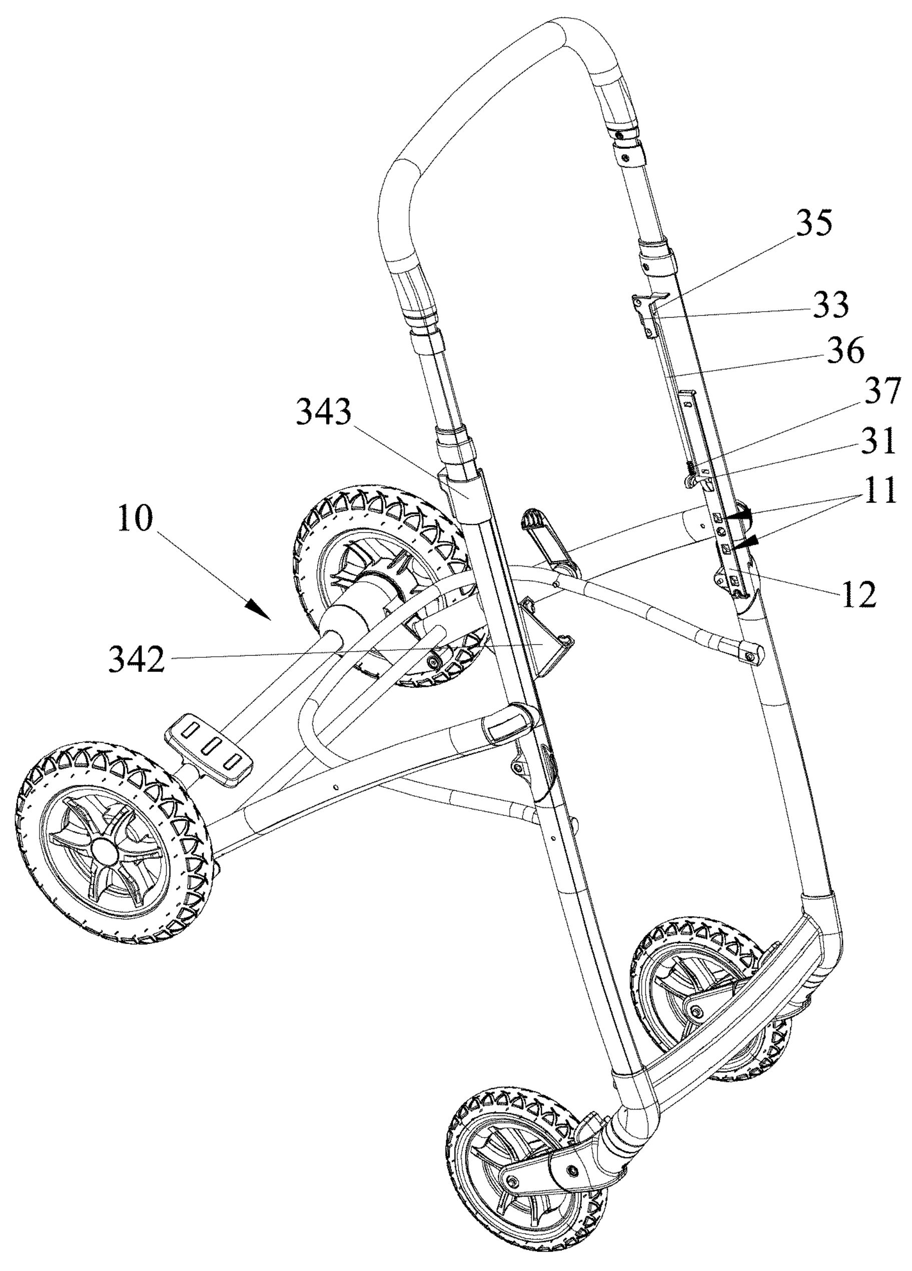
FIG. 3 is a schematic diagram of a three-dimensional structure of a height adjustment mechanism on the carrier frame as shown in FIG. 2 from another angle, in which a fixing seat is removed.
Figure 4:
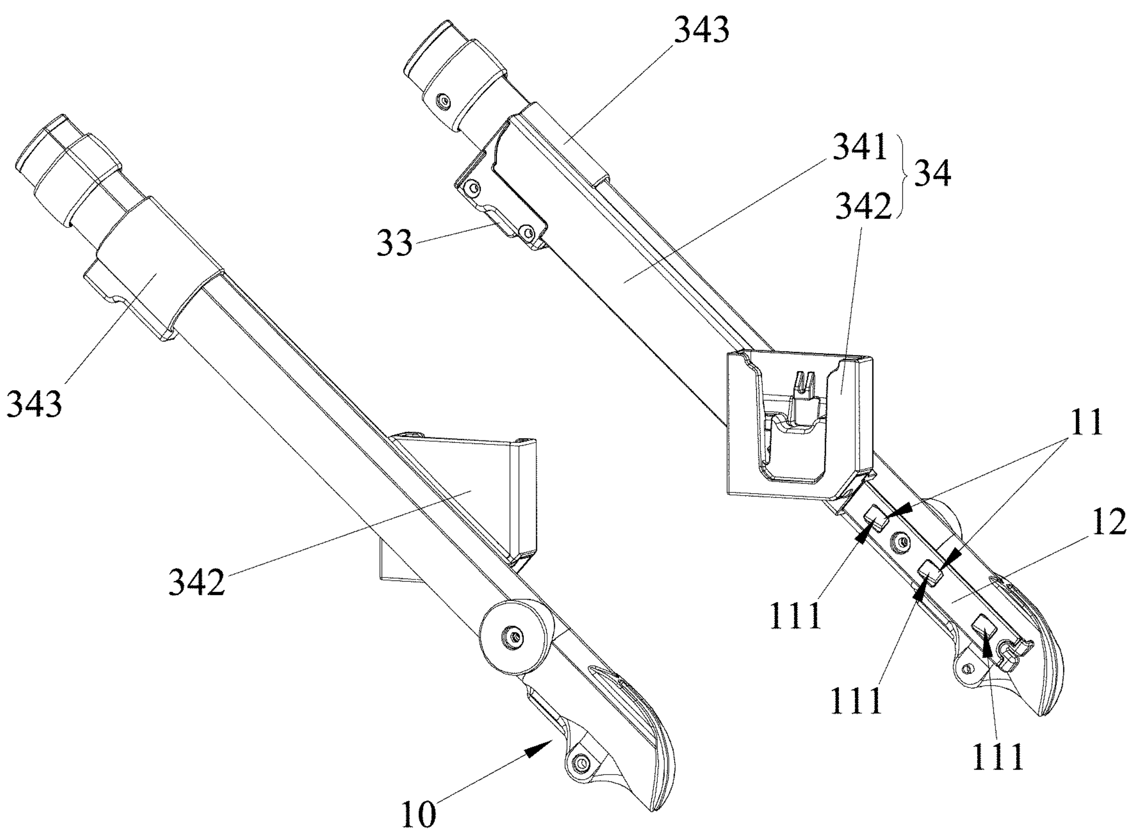
FIG. 4 is a schematic diagram of a three-dimensional structure of the carrier frame as shown in FIG. 3, in which part of its structure is removed.
Figure 5:
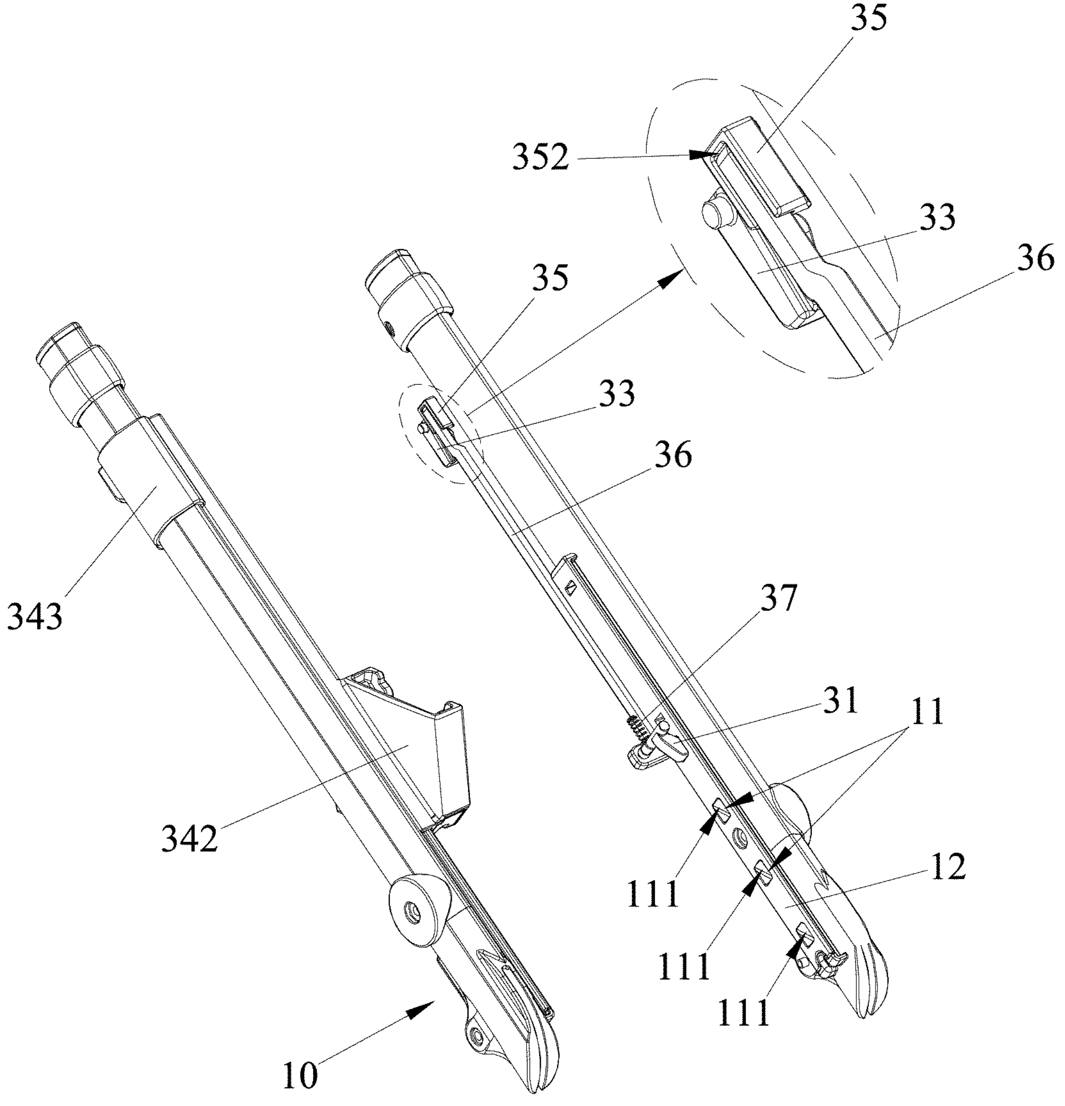
FIG. 5 is a schematic diagram of a three-dimensional structure and an enlarged schematic diagram of its partial structure of the height adjustment mechanism on the carrier frame as shown in FIG. 4, in which the fixing seat is removed.
Figure 6:
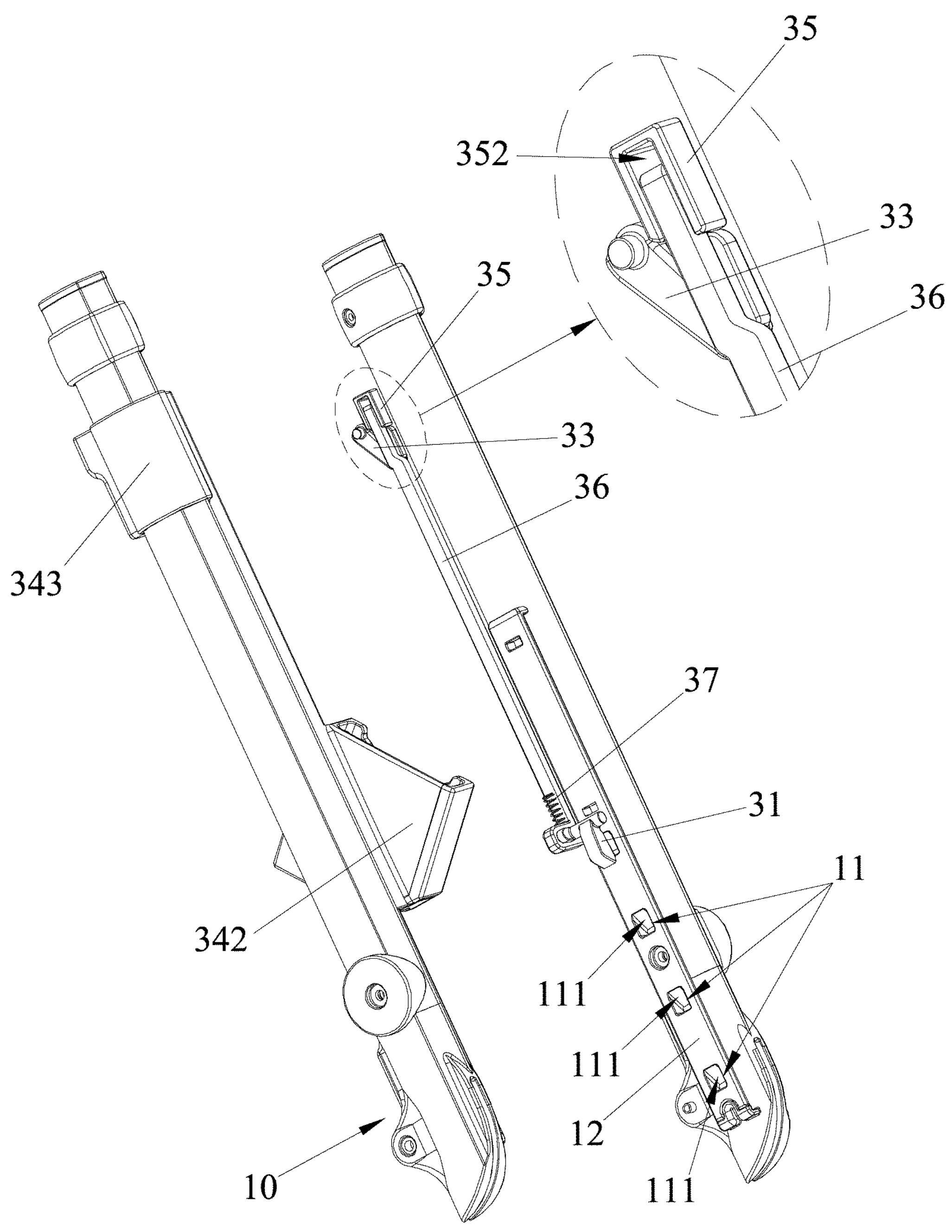
FIG. 6 is a schematic diagram of a three-dimensional structure and an enlarged schematic diagram of its partial structure of the height adjustment mechanism on the carrier frame as shown in FIG. 5 when the release operation member is pressed down.
Figure 7:
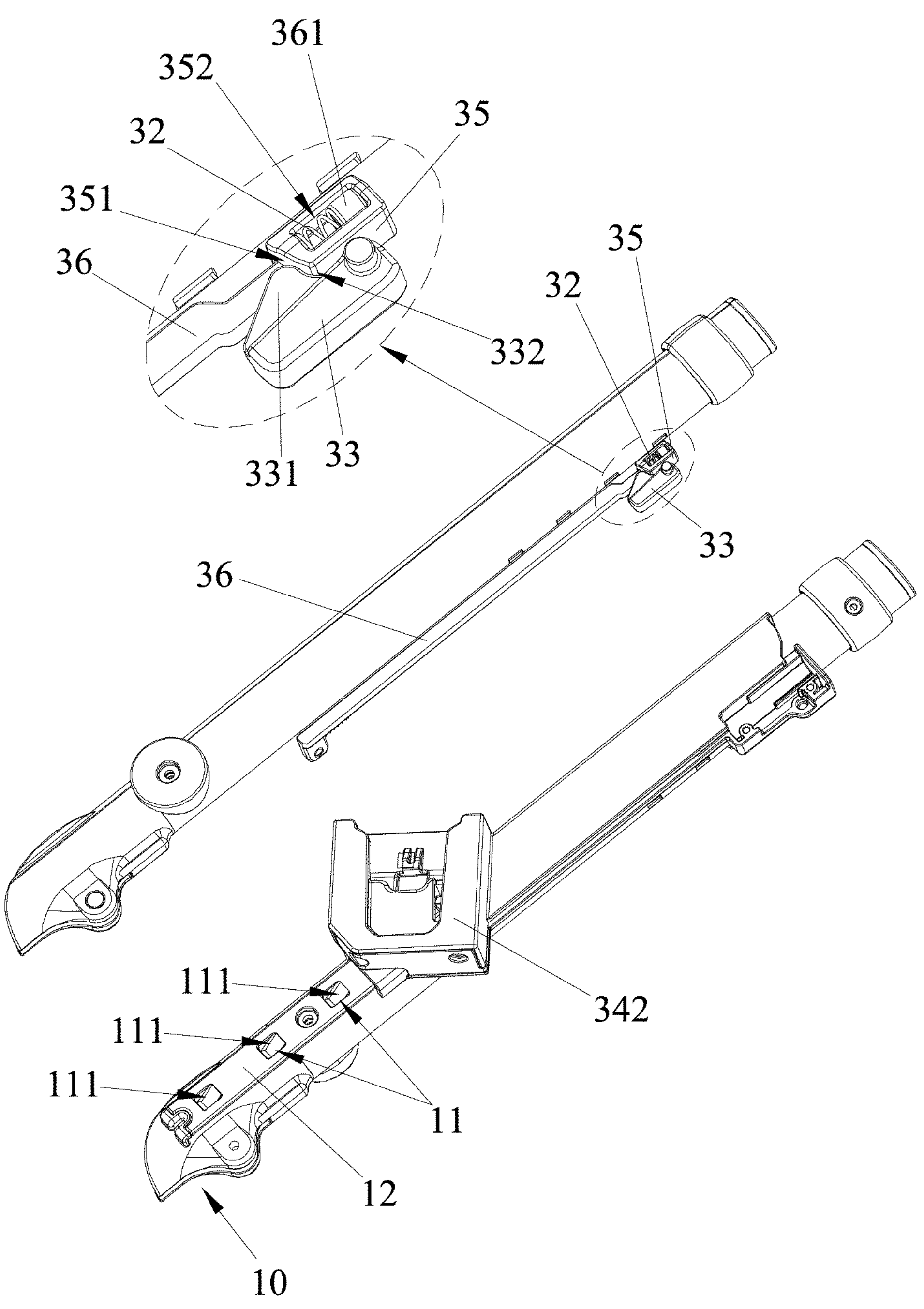
FIG. 7 is a schematic diagram of a three-dimensional structure and an enlarged schematic diagram of the partial structure of the carrier frame as shown in FIG. 5 and the height adjustment mechanism thereon from another angle.
Figure 8:
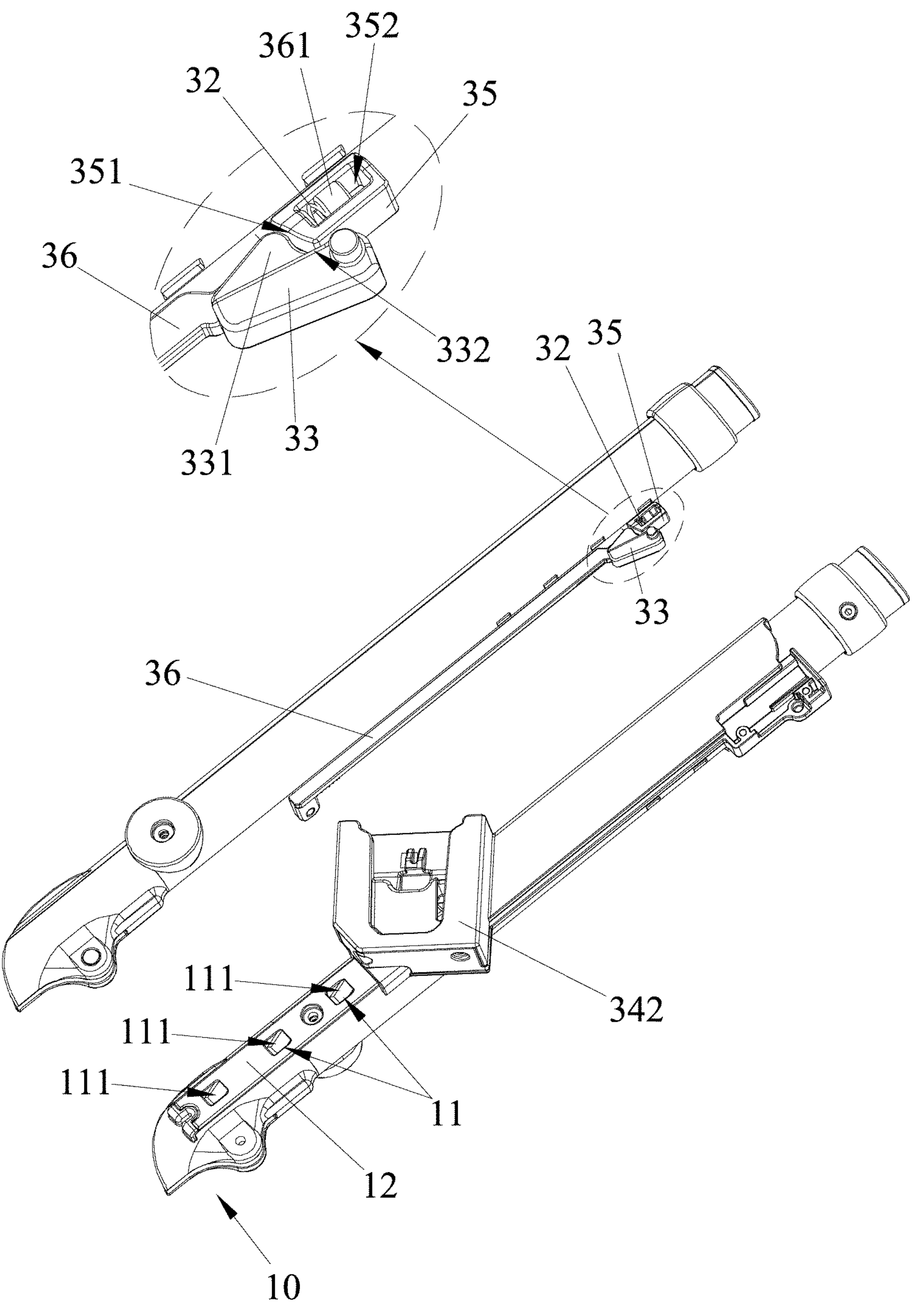
FIG. 8 is a schematic diagram of a three-dimensional structure and an enlarged schematic diagram of the partial structure of the carrier frame as shown in FIG. 6 and the height adjustment mechanism thereon from another angle.
Figure 9:
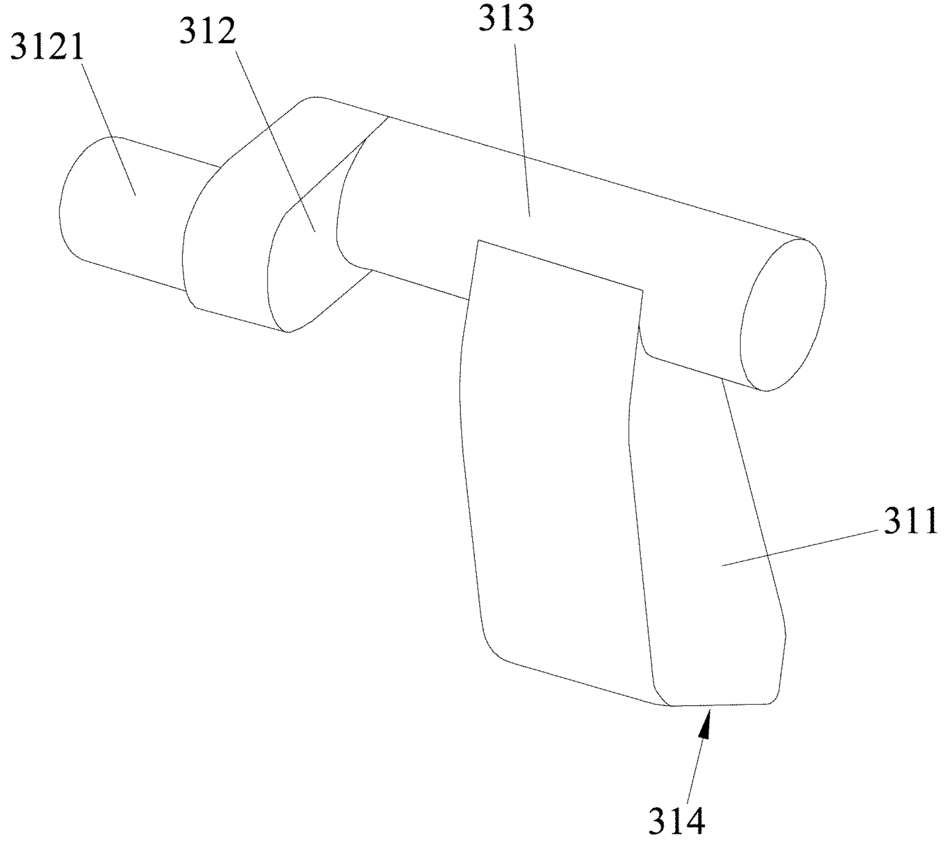
FIG. 9 is a schematic diagram of a three-dimensional structure of the positioning member in the height adjustment mechanism according to the disclosure.
Figure 10:
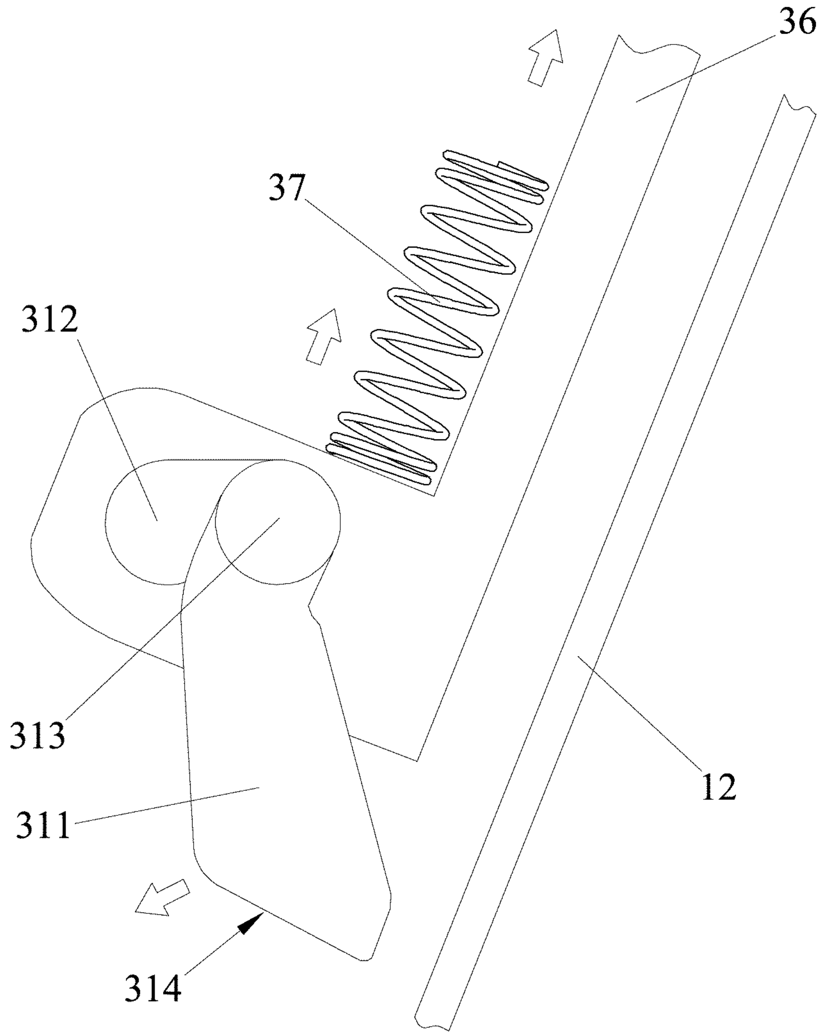
FIG. 10 is a schematic plan view of the height adjustment mechanism according to the disclosure, in which the positioning member is released from the positioning portion when the release operation member is pressed down and the carrier body is adjusted upward.
Figure 11:
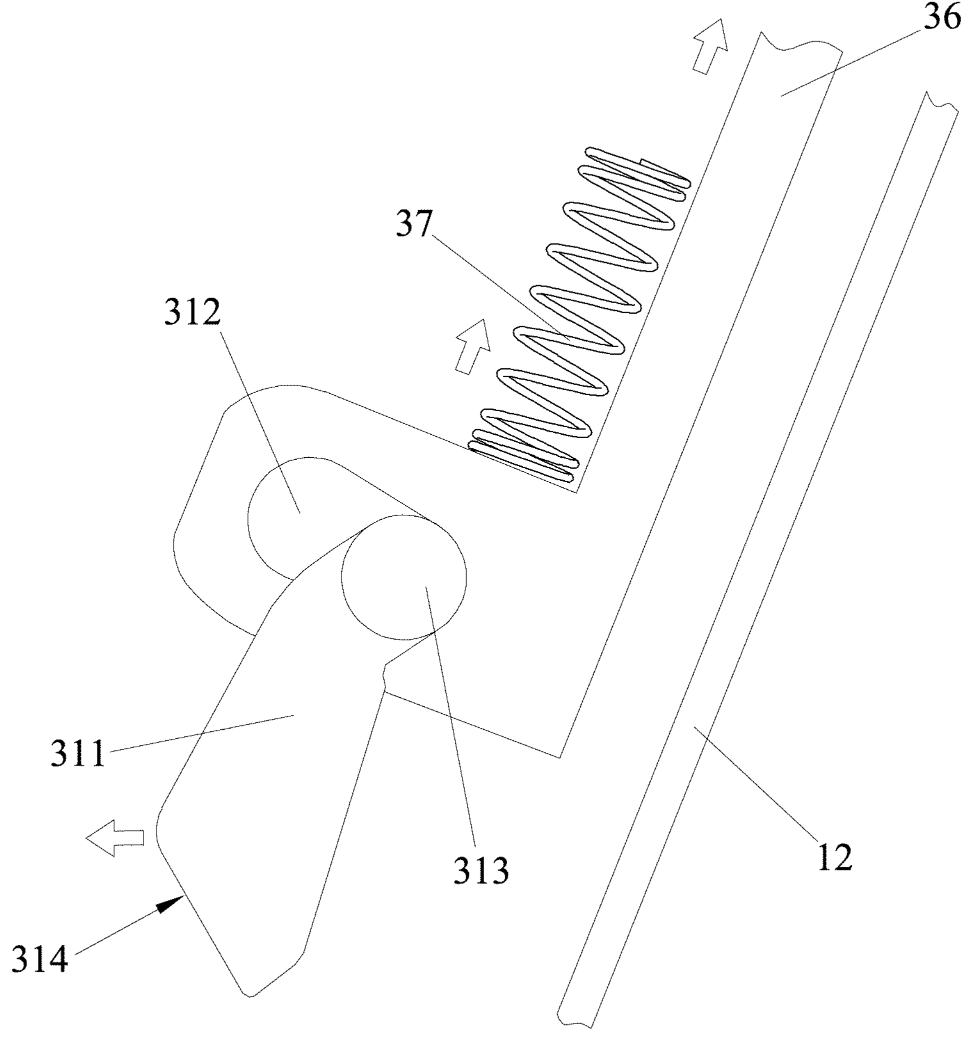
FIG. 11 is a schematic plan view of the height adjustment mechanism according to the disclosure, in which the positioning member has been released from the positioning portion when the release operation member is pressed down and the carrier body is adjusted upward.

As shown in FIGS. 1 and 2, the infant carrier 100 according to the disclosure comprises a carrier frame 10, a carrier body 20 and a height adjustment mechanism 30. As described below, in the height adjustment mechanism 30, a fixing seat 34 is assembled on the carrier body 20, a fixing seat 34 is slidably arranged on the carrier frame 10 and is slidably adjustable with respect to the carrier frame 10. During an engaging release process, when adjusting the height of the carrier body 20, the carrier body 20 needs to be lifted up for adjusting the height so as to avoid faulty operations of the height adjustment of the carrier body 20, such that the infant carrier 100 according to the disclosure can prevent an accidental locking release of the carrier body 20 on the carrier frame 10 caused by an accidental touch, thus effectively ensuring safe use. For example, the carrier body 20 is mainly a device for carrying infants and young children, such as a baby sleeping box, a safety seat, or a baby dining chair, but not limited thereto. And, a carrier frame 10 is mainly divided into two types, one type is such a carrier frame 10, for example a trolley frame, which can provide a mobile function, and the other type is such a carrier frame 10, for example a baby dining chair frame or the like, which can provide fixing and supporting functions, but not limited thereto. In summary, those skilled in the art may connect the carrier body 20 on an existing carrier frame 10 according to actual needs without any creative work, for achieving combination usage according to actual needs, so the details would not be repeatedly described herein. Hereinafter, the height adjustment mechanism 30 according to the disclosure would be further described in detail with reference to FIGS. 2-13.

As shown in FIGS. 2-8 and FIGS. 12, 13, the height adjustment mechanism 30 may comprise a positioning member 31, an elastic member 32, a release operation member 33, a fixing seat 34, a sliding member 35 slidably arranged on the fixing seat 34, and a connecting member 36. The fixing seat 34 may be slidably arranged on the carrier frame 10, and may be slidably adjustable with respect to the carrier frame 10. The carrier frame 10 may at least have two the positioning portions 11. The positioning member 31 may be movably assembled on the fixing seat 34, and may be selectively engaged with any of the positioning portions 11. The release operation member 33 may be movably assembled on the fixing seat 34, and may be linked with the positioning member 31 through the elastic member 32. During an engaging release process, a force of the release operation member 33 for making the elastic member 32 to generate an elastic deformation is smaller than a resisting force generated by both the fixing seat 34 and the carrier body 20 on the fixing seat 34 for blocking an engaging release movement of the positioning member 31. Thus, although the release operation member 33 is operated, since the carrier body 20 is not adjusted upward, there is not an acting force for lifting the carrier body 20 to balance the resisting force for blocking the engaging release movement of the positioning member 31 generated by both the fixing seat 34 and the carrier body 20. Therefore, the elastic force generated by the elastic member 32 due to the operation of the release operation member 33 is not enough to make the connecting member 36 slide upwards, and the positioning member 31 installed in the connecting member 36 naturally cannot move, so the engaging portion 311 in the positioning member 31 always keeps engaging with one of the positioning portion 11, and the carrier body 20 may maintain being locked on the carrier frame 10, such that the height of the carrier body 20 cannot be adjusted, and thereby during the height adjustment process of the carrier body 20, the carrier body 20 needs to be lifted up to release the locking of the height adjustment mechanism 30, so as to effectively avoid an accidental locking release caused by an accidental touch. For example, the elastic member 32 is a compression spring. According to actual requirements, the elastic member 32 may be a pair of magnetic members with opposite polarities, wherein the positive pole member is installed on the connecting member 36, and the negative pole member is installed on the sliding member 35, but not limited thereto. Specifically, the sliding member 35 and the elastic member 32 may be connected in abutment manner. During the engaging release process, the release operation member 33 may push the sliding member 35 to slide upward, and the sliding member 35 sliding upward pushes the elastic member 32 to be elastically deformed, in order to facilitate the elastic deformation of the elastic member 32. More specifically, the positioning member 31 may be installed on the first end of the connecting member 36, the sliding member 35 may be slidably arranged on the second end of the connecting member 36. The elastic member 32 may be disposed between the sliding member 35 and the connecting member 36. By means of the arrangement of the connecting member 36, the linkage structure between the operation member 33 and the positioning member 31 is simplified. In order to facilitate the positioning member 31 to restore and engage with the positioning portion 11 on the carrier frame 10, the height adjustment mechanism 30 may further comprise an engaging restoration member 37 disposed between the fixing seat 34 and the connecting member 36, and the engaging restoration member 37 may always has a tendency for driving the connecting member 36 to slide down.

As shown in FIGS. 4-8, the release operation member 33 may be telescopically hinged to the fixing seat 34, and can press down the release operation member 33 to rotate and retract into the fixing seat 34 so as to release the engaging, so the operation of the release operation member 33 is simple and convenient. Specifically, the release operation member 33 may be provided with a pushing projection 331 protruding outward, and a positioning notch 332 may be formed between the pushing projection 331 and the release operation member 33. The sliding member 35 may be disposed in the positioning notch 332 and connected with the release operation member 33 in abutment manner, and the release operation member 33 being pressed down may rotate to retract into the fixing seat 34, such that the pushing projection 331 may push the sliding member 35 to slide upward. Thus, the linkage structure of the release operation member 33 and the sliding member 35 is simple and easy to realize, and beneficial to reduce the production difficulty and the production cost. More specifically, on the bottom of the sliding member 35, an inclined plane for pushing 351 is arranged obliquely relative to a sliding direction of the sliding member 35. The pushing projection 331 may be pressed against the inclined plane for pushing 351 of the sliding member 35. The arrangement of the inclined plane for pushing 351 on the sliding member 35 can facilitate the release operation member 33 to push the sliding member 35 to slide.

As shown in FIGS. 5-8, the sliding member 35 may have an installation chamber 352. The second end of the connecting member 36 may be movably arranged in the installation chamber 352. The elastic member 32 may be disposed in the installation chamber 352. By means of the cooperation of the installation chamber 352 and the connecting member 36, the sliding member 35 may slide smoothly and stably on the connecting member 36, which is conducive to hide the elastic member 32 and further simplifies the structure. Specifically, the second end of the connecting member 36 is provided with a blocking protrusion 361, the first end of the elastic member 32 presses against the blocking protrusion 361, and the second end of the elastic member 32 presses against the bottom wall of the installation chamber 352 in the sliding member 35, such that the elastic member 32 may be stably installed in the installation chamber 352.

As shown in FIGS. 5-9, the positioning member 31 may comprise a engaging portion 311 and a pivoting portion 312. The pivoting portion 312 may have a first end pivotally connected to the first end of the connecting member 36. The engaging portion 311 may have a first end installed on a second end of the pivoting portion 312 and pivotally connected to the fixing seat 34. The pivoting portion 312 may be pivotally and swingably disposed on the connecting member 36, and the arrangement of the pivoting portion 312 may cause the positioning member 31 to displace and rotate at the same time, so as to facilitate the positioning member 31 to effectively and stably engage with and disengage with the positioning portion 11 on the carrier frame 10. In an embodiment, a rotation shaft 3121 perpendicular to the pivoting portion 312 may be provided on the first end of the pivoting portion 312. The pivoting portion 312 may be pivotally connected to the first end of the connecting member 36 via the rotation shaft 3121 to facilitate the pivotal movement of the pivoting portion 312. Specifically, the positioning member 31 may further comprise a pivot shaft 313. A first end of the pivot shaft 313 may be rotatably assembled to the fixing seat 34, and a second end of the pivoting portion 312 may be installed on a second end of the pivot shaft 313. The first end of the engaging portion 311 may be installed at a position between two ends of the pivot shaft 313. The arrangement of the pivot shaft 313 provides a fulcrum for rotating the positioning member 31 so as to facilitate the rotation of the positioning member 31. More specifically, the engaging portion 311 may be a block-shaped member with a width gradually increasing from its first end to second end. An inclined plane for inserting and engaging 314 may be provided on the bottom surface of the second end of the engaging portion 311. The second end of the engaging portion 311 may have a bigger width and is not easy to be crushed. The inclined plane for inserting and engaging 314 facilitates the engaging portion 311 to engage in or release from the positioning portion 11. In an embodiment, the connecting member 36 may be a rod-shaped member, and the sliding direction of the sliding member 35 may be the same as the sliding direction of the connecting member 36. Thus, the connecting member 36 has a simple structure and is easy to arrange and fabricate. That the sliding member 35 and the connecting member 36 slide in the same direction may greatly simplify the structure of the height adjustment mechanism 30, and the structure of the height adjustment mechanism 30 may be more compact. In an embodiment, since the rotation direction of the release operation member 33 is different from the rotation direction of the positioning member 31, the connecting member 36 will have a small swing during the sliding process.

Figure 12:
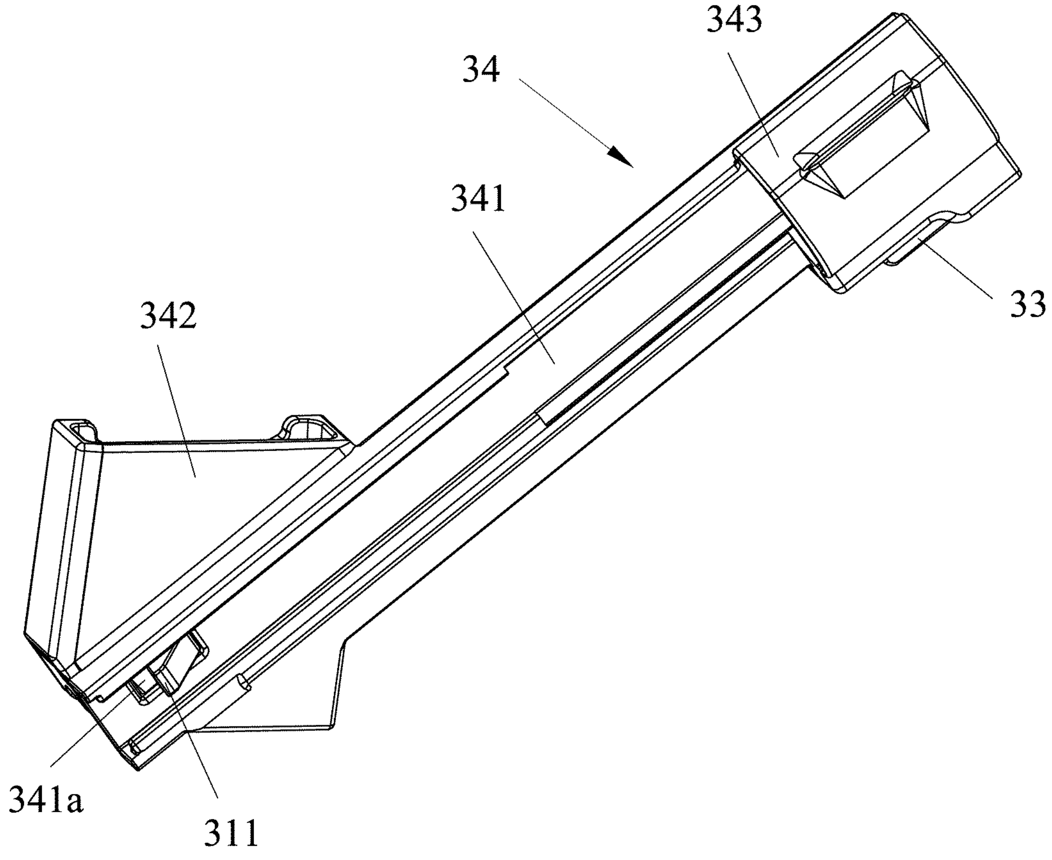
FIG. 12 is a schematic diagram of a three-dimensional structure of a height adjustment mechanism according to the disclosure from another angle.
Figure 13:
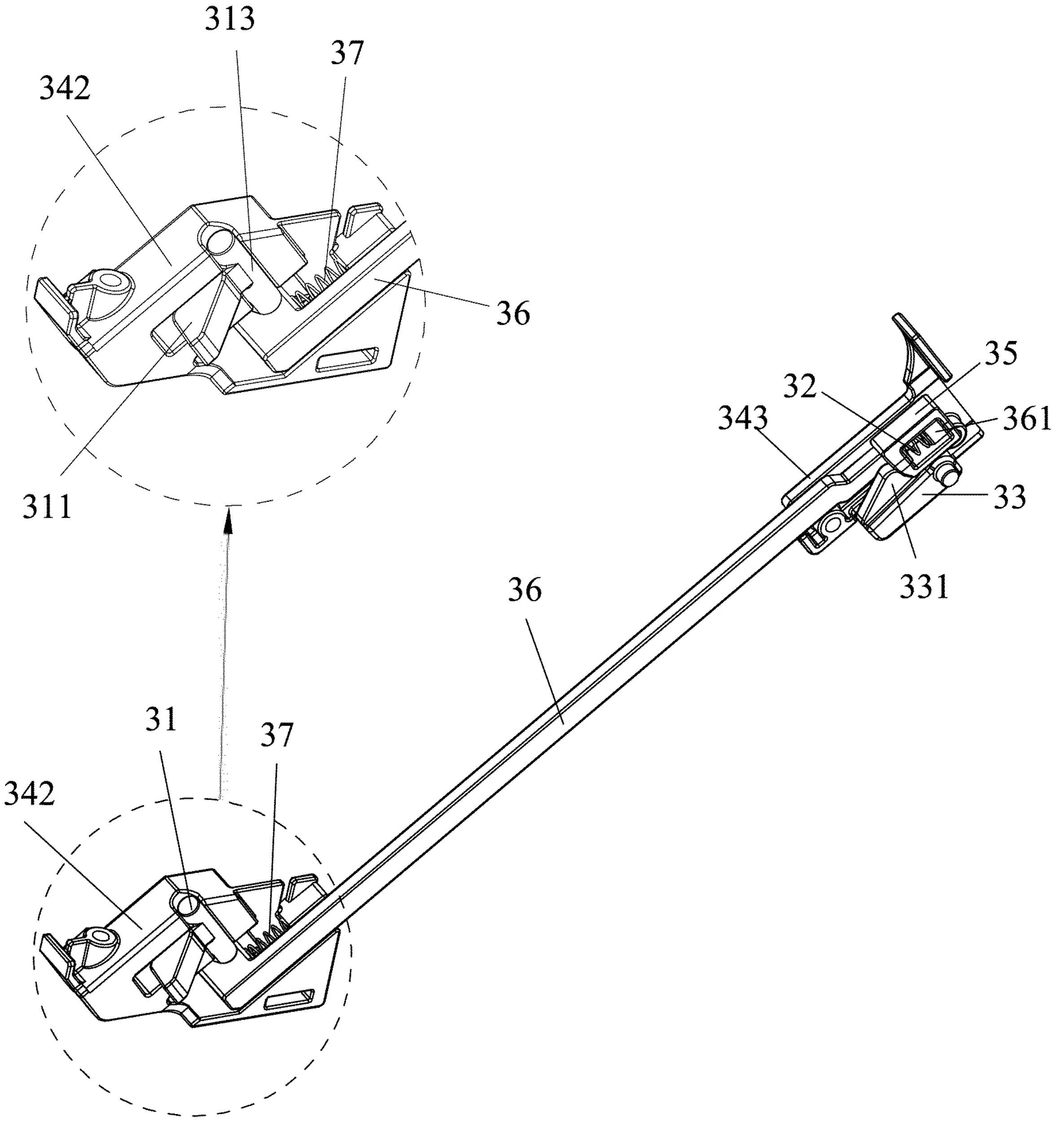
FIG. 13 is a schematic diagram of a three-dimensional structure and an enlarged schematic diagram of its partial structure of a height adjustment mechanism as shown in FIG. 12, in which partial structure of the fixing seat is removed.

As shown in FIGS. 2-8, a sliding rail 12 may be installed on the carrier frame 10. The fixing seat 34 may be slidably assembled on the sliding rail 12. All of the positioning portions 11 may be arranged on the sliding rail 12 at intervals. Thus, the fixing seat 34 can quickly and stably slide on the carrier frame 10 along the sliding rail 12, so as to facilitate the quick height adjustment of the carrier body 20 on the carrier frame 10. For example, the positioning portion 11 may be a slot structure, such as a sink hole structure, so as to facilitate the engaging between the positioning member 31 and the positioning portion 11, but not limited thereto. Specifically, the upper side wall of the positioning portion 11 is an inclined plane for sliding 111 arranged obliquely and inwardly from top to bottom. When the carrier body 20 is adjusted upwards, the positioning member 31 is driven to move upward, and then the engaging portion 311 may be quickly pushed out from the positioning member 31 by means of the inclined plane for sliding 111 to facilitate the quick release of the engaging. More specifically, as shown in FIG. 12, the fixing seat 34 may comprise a long handle portion 341 and a holding seat portion 342 installed on the lower end of the long handle portion 341, a through hole 341*a*, through which the engaging portion 311 passes, is formed at the position of the lower end of the long handle portion 341 and the holding seat portion 342 corresponding to the engaging portion 311. The release operation member 33 may be arranged in the upper end of the long handle portion 341. A sleeve ring 343 may be installed on the upper end of the long handle portion 341. The sleeve ring 343 may be slidably sleeved on the carrier frame 10. The sleeve ring 343 may prevent the fixing seat 34 from misplacing, such that the fixing seat 34 may slide stably on the carrier frame 10. The carrier body 20 may be assembled to the carrier frame 10 by means of the holding seat portion 342 so as to facilitate the disassembly between the carrier body 20 and the carrier frame 10. For example, the holding seat portion 342 may have an engaging chamber to facilitate the engaging of the carrier body 20 in the engaging chamber. The release operation member 33 is arranged on the upper end of the long handle portion 341 to facilitate the user's operation.

In combination with FIGS. 1-13, the working principle of the infant carrier 100 according to the disclosure will be described: when in use, the carrier body 20 will be engaged into the holding seat portion 342 of the fixing seat 34; when the height of the carrier body 20 needs to be adjusted, the release operation member 33 may be pressed down, rotated into and retracted in the fixing seat 34; the pushing projection 331 of the release operation member 33 may press the sliding member 35 to slide upward, and the sliding member 35 sliding upward may continuously compress the elastic member 32 upward, but at this time, the blocking protrusion 361 at the second end of the connecting member 36 will not slide upward under the action of the elastic member 32, that is, the connecting member 36 will not slide upward, because the weights of the fixing seat 34 and the carrier body 20 makes the engaging portion 311 in the positioning member 31 installed at the first end of the connecting member 36 always engage in a positioning portion 11, and the inclined plane 314 for inserting and engaging of the engaging portion 311 in the positioning member 31 is always kept against the bottom surface of the positioning portion 11, while, the elastic deformation force of the elastic member 32 is less than a resisting force generated by both the fixing seat 34 and the carrier body 20 for blocking an engaging release movement of the positioning member, that is, the elastic force generated after the elastic member 32 is compressed is not enough to disengage the engaging portion 311 of the positioning member 31 from the positioning portion 11, so the positioning member 31 cannot move, which can prevent the carrier body 20 from engaging release by accidentally touching the release operation member 33. After that, when the carrier body 20 is lifted upward, the weights of the fixing seat 34 and the carrier body 20 no long act on the place of engagement between the engaging portion 311 and the positioning portion 11, so that the inclined plane 314 for inserting and engaging of the engaging portion 311 could be disengaged from abutting against the positioning portion 11; at this time, the elastic member 32 being compressed restore its original shape, the elastic member 32 pushes the blocking protrusion 361 and pushes the connecting member 36 to slide upward, the connecting member 36 drives the pivoting portion 312 of the positioning member 31 to pivot and swing, the pivot shaft 313 rotates around its own axis so as to rotate the engaging portion 311 of the positioning member 31, and the engaging portion 311 of the positioning member 31 disengages from the positioning portion 11. In this way, the fixing seat 34 can be slidably adjusted relative to the carrier frame 10, the height of the carrier body 20 may be adjusted. In the height adjustment process of the carrier body 20, since the lock height adjustment mechanism 30 cannot be released only by operating the release operation member 33, the carrier body 20 needs to be lifted up so as to release the locking of the height adjustment mechanism 30, it is possible to effectively avoid an accidental locking release caused by accidentally touching the release operation member 33, and the relevant working principle is mentioned as above.

In comparison with prior art, the height adjustment mechanism 30 according to the disclosure may comprise a positioning member 31, an elastic member 32, a release operation member 33, a fixing seat 34, a sliding member 35 slidably arranged in the fixing seat 34, and a connecting member 36. The fixing seat 34 may be slidably arranged on the carrier frame 10, and slidably adjusted with respect to the carrier frame 10. The carrier frame 10 may at least have two positioning portions 11. The positioning member 31 may be movably assembled on the fixing seat 34, and selectively engaged with any of the positioning portions 11. The release operation member 33 may be movably installed on the fixing seat 34. The release operation member 33 may also be linked with the positioning member 31 through the elastic member 32. During the engaging release process, a force of the release operation member 33 for making the elastic member 32 to generate an elastic deformation is smaller than a resisting force generated by both the fixing seat 34 and the carrier body 20 on the fixing seat 34 for blocking the engaging release movement of the positioning member 31. Therefore, although the release operation member 33 is operated, since the carrier body 20 is not adjusted upward, there is a lack of an acting force for lifting the carrier body 20 to balance the resisting force for blocking the engaging release movement of the positioning member 31 generated by both the fixing seat 34 and the carrier body 20. Thus, the elastic force generated by the elastic member 32 due to the operation of the release operation member 33 is not enough to make the connecting member 36 slide upwards, and the positioning member 31 installed in the connecting member 36 naturally cannot move, so the engaging portion 311 in the positioning member 31 always keeps engaging with one of the positioning portion 11, and the carrier body 20 maintains being locked on the carrier frame 10, such that the height of the carrier body 20 cannot be adjusted, and thereby during the height adjustment process of the carrier body 20, the carrier body 20 needs to be lifted up to release the locking of the height adjustment mechanism 30, so as to effectively avoid an accidental locking release caused by an accidental touch.

It may be understood, since the infant carrier 100 according to the disclosure comprises a carrier frame 10, a carrier body 20, and an height adjustment mechanism 30, the infant carrier 100 according to the disclosure may avoid an accidental unlock of the carrier body 20 on the carrier frame 10 caused by an accidental touch.

The above-disclosed contents are only preferred examples of the present disclosure, and cannot be used to limit the protection scope of the present disclosure. Therefore, all equivalent changes made according to the claims of the present application fall within the scope of the present disclosure.

The invention claimed is:

1. A height adjustment mechanism for an infant carrier, the infant carrier comprising a carrier frame and a carrier body, wherein the height adjustment mechanism comprises:

a positioning member, an elastic member, a release operation member, and a fixing seat for assembling and connecting with the carrier body; the fixing seat is slidably arranged on the carrier frame and is slidably adjustable with respect to the carrier frame;

wherein the carrier frame comprises at least two positioning portions, the positioning member is movably assembled on the fixing seat and engageable with a selected one of the positioning portions;

the release operation member is movably installed on the fixing seat, the release operation member is linked with the positioning member through the elastic member;

during a release process in which the release operation member is operated to move, when a force of the release operation member for causing the elastic member to generate an elastic deformation is smaller than a resisting force generated by both the fixing seat and the carrier body on the fixing seat, a release movement of the positioning member is blocked and the positioning member remains engaged with the selected positioning portion.

2. The height adjustment mechanism according to claim 1, wherein the release operation member is telescopically hinged to the fixing seat, and due to the operation of the release operation member, the release operation member rotates and retracts into the fixing seat to release the engagement between the positioning member and the selected positioning.

3. The height adjustment mechanism according to claim 1, wherein a sliding rail is installed on the carrier frame, the fixing seat is slidably assembled on the sliding rail, and all of the positioning portions are arranged on the sliding rail at intervals.

4. The height adjustment mechanism according to claim 1, wherein the positioning portion is a slot structure.

5. The height adjustment mechanism according to claim 1, wherein the fixing seat comprises a long handle portion and a holding seat portion installed at a lower end of the long handle portion, the release operation member is arranged in an upper end of the long handle portion, a sleeve ring is installed on the upper end of the long handle portion and is slidably sleeved on the carrier frame.

6. An infant carrier comprising a carrier frame and a carrier body, wherein the infant carrier further comprises a height adjustment mechanism according to claim 1, and the fixing seat is assembled on the carrier body.

7. The infant carrier according to claim 6, wherein the carrier frame is a trolley frame or a baby dining chair frame.

8. The infant carrier according to claim 6, wherein the carrier body is a baby sleeping box, a safety seat, or a baby dining chair.

9. A height adjustment mechanism for an infant carrier, the infant carrier comprising a carrier frame and a carrier body, wherein the height adjustment mechanism comprises:

a positioning member, an elastic member, a release operation member, a fixing seat for assembling and connecting with the carrier body; the fixing seat is slidably arranged on the carrier frame and is slidably adjustable with respect to the carrier frame; and a sliding member slidably arranged in the fixing seat, the sliding member and the elastic member are connected in abutment manner;

wherein the carrier frame comprises at least two positioning portions, the positioning member is movably assembled on the fixing seat and engageable with a selected one of the positioning portions;

the release operation member is movably installed on the fixing seat, the release operation member is linked with the positioning member through the elastic member;

during a release process in which the release operation member is operated to move, when a force of the release operation member for causing the elastic member to generate an elastic deformation is smaller than a resisting force generated by both the fixing seat and the carrier body on the fixing seat, a release movement of the positioning member is blocked and the positioning member remains engaged with the selected positioning portion; and during the release process where the release operation member is operated to move, the release operation member pushes the sliding member to slide upward and push the elastic member such that the elastic member is elastically deformed and the positioning member is disengaged from the selected positioning portion.

10. The height adjustment mechanism according to claim 9, wherein the release operation member is provided with a pushing projection protruding outward, a positioning notch is formed between the pushing projection and the release operation member, the sliding member is arranged in the positioning notch and is connected with the release operation member in abutment manner, and due to the operation of the release operation member, the release operation member rotates and retracts into the fixing seat, such that the pushing projection pushes the sliding member to slide upward.

11. The height adjustment mechanism according to claim 10, wherein the sliding member has a bottom on which an inclined plane for pushing is arranged obliquely relative to a sliding direction of the sliding member, and the pushing projection bears against the inclined plane for pushing of the sliding member.

12. The height adjustment mechanism according to claim 9, wherein the height adjustment mechanism further comprises a connecting member, the positioning member is installed on a first end of the connecting member, the sliding member is slidably arranged on a second end of the connecting member, and the elastic member is arranged between the sliding member and the connecting member.

13. The height adjustment mechanism according to claim 12, wherein the sliding member has an installation chamber, the second end of the connecting member is movably arranged in the installation chamber, and the elastic member is arranged in the installation chamber.

14. The height adjustment mechanism according to claim 13, wherein the second end of the connecting member is provided with a blocking protrusion, the first end of the elastic member bears against the blocking protrusion, and the second end of the elastic member bears against a bottom wall of an installation chamber in the sliding member.

15. The height adjustment mechanism according to claim 12, wherein the positioning member comprises an engaging portion and a pivoting portion, the pivoting portion has a first end pivotally connected to the first end of the connecting member, the engaging portion has a first end installed on a second end of the pivoting portion and pivotally connected to the fixing seat, and the pivoting portion is pivotally and swingably disposed on the connecting member.

16. The height adjustment mechanism according to claim 15, wherein the positioning member further comprises a pivot shaft, the pivot shaft has a first end rotatably assembled on the fixing seat and a second end installed on a second end of the pivot shaft, and the first end of the engaging portion is installed on a part between two ends of the pivot shaft.

17. The height adjustment mechanism according to claim 15, wherein the engaging portion is a block-shaped member with a width gradually increasing from its first end to its second end, and an inclined plane for inserting and engaging is provided on a bottom surface of the second end of the engaging portion.

18. The height adjustment mechanism according to claim 12, wherein the height adjustment mechanism further comprises an engaging restoration member arranged between the fixing seat and the connecting member, and the engaging restoration member always has a tendency for driving the connecting member to slide down.

19. The height adjustment mechanism according to claim 12, wherein the connecting member is a rod-shaped member, and a sliding direction of the sliding member is the same as a sliding direction of the connecting member.

20. A height adjustment mechanism for an infant carrier, the infant carrier comprising a carrier frame and a carrier body, wherein the height adjustment mechanism comprises:

a positioning member, an elastic member, a release operation member, and a fixing seat for assembling and connecting with the carrier body; the fixing seat is slidably arranged on the carrier frame and is slidably adjustable with respect to the carrier frame;

wherein the carrier frame comprises at least two positioning portions, each positioning portion is a slot structure, an upper side wall of each positioning portion is an inclined plane for sliding, which is arranged inclinedly and inwardly from top to bottom, the positioning member is movably assembled on the fixing seat and engageable with a selected one of the positioning portions;

the release operation member is movably installed on the fixing seat, the release operation member is linked with the positioning member through the elastic member; and during a release process in which the release operation member is operated to move, when a force of the release operation member for causing the elastic member to generate an elastic deformation is smaller than a resisting force generated by both the fixing seat and the carrier body on the fixing seat, a release movement of the positioning member is blocked and the positioning member remains engaged with the selected positioning portion.

* * * * *